United States Patent [19]

Kawaguchi et al.

[11] Patent Number: 5,294,134
[45] Date of Patent: Mar. 15, 1994

[54] METALLIC GASKET

[75] Inventors: Shigeru Kawaguchi, Daitou; Kenji Kubouchi, Hirakata; Masahiko Miura, Kawachinagano; Kunitoshi Inoue, Higashiosaka, all of Japan

[73] Assignee: Nippon Gasket Company, Ltd., Osaka, Japan

[21] Appl. No.: 17,419

[22] Filed: Feb. 10, 1993

Related U.S. Application Data

[63] Continuation of Ser. No. 731,234, Jul. 17, 1991, abandoned.

[30] Foreign Application Priority Data

Jan. 10, 1991 [JP] Japan .................. 3-011692

[51] Int. Cl.⁵ .................................. F16J 15/08
[52] U.S. Cl. ............................ 277/180; 277/235 B
[58] Field of Search ............... 277/180, 231, 233, 234, 277/235 A, 235 B, 235 R, 236

[56] References Cited

U.S. PATENT DOCUMENTS

| | | | |
|---|---|---|---|
| 1,793,423 | 2/1931 | Fitzgerald | 277/235 B |
| 1,793,425 | 2/1931 | Fitzgerald | 277/235 B |
| 3,430,611 | 3/1969 | Belter | 277/235 B |
| 3,549,157 | 12/1970 | Bennigsen | 277/233 X |
| 3,817,540 | 6/1974 | Nicholson | 277/236 |
| 4,330,585 | 3/1982 | Eyrard et al. | 277/235 B X |
| 4,519,619 | 5/1985 | Doyle | 277/253 B |
| 4,688,809 | 8/1987 | Deppe | 277/235 B |
| 4,759,556 | 7/1989 | Udagawa | 277/235 B |
| 4,836,562 | 6/1989 | Yoshino | 277/235 B |
| 4,869,516 | 10/1989 | Udagawa | 277/234 |
| 4,998,741 | 5/1991 | Udagawa | 277/236 X |

FOREIGN PATENT DOCUMENTS

| | | | |
|---|---|---|---|
| 0230804 | 8/1987 | European Pat. Off. | 277/235 B |
| 0406730 | 1/1991 | European Pat. Off. | 277/235 B |
| 0077970 | 5/1983 | Japan | 277/235 R |
| 155376 | 7/1987 | Japan | |
| 134966 | 8/1987 | Japan | |
| 0101575 | 5/1988 | Japan | 277/235 B |
| 0186950 | 8/1988 | Japan | 277/235 B |
| 0210464 | 9/1988 | Japan | 277/235 B |
| 0058868 | 5/1989 | Japan | 277/235 R |
| 1-211660 | 8/1989 | Japan | |
| 2097870 | 11/1982 | United Kingdom | 277/235 B |
| 2121123 | 12/1983 | United Kingdom | |

*Primary Examiner*—William A. Cuchlinski, Jr.
*Assistant Examiner*—Scott W. Cummings
*Attorney, Agent, or Firm*—Browdy and Neimark

[57] ABSTRACT

In the metallic gasket according to the present invention, beads are formed on the circumferential portions of the first cylinder bore-aligned holes in the base member, and folded portions are formed on the auxiliary member by merely folding back the inner edge sections of the second cylinder bore-aligned holes therein so as not to embrace the bead-carrying base member, the auxiliary member being laminated on the side of the base member from which the beads project. In this metallic gasket, the folded portions of the auxiliary member restrict the deformation of the beads to minimize the occurrence of fatigue and cracks in the beads, whereby the sealing function of the gasket is improved with uniform and proper surface pressure distribution maintained. Soft members are provided between the main portion of the auxiliary member and the folded portions thereof so as to secure proper surface pressure distribution in the metallic gasket in accordance with the rigidity of the cylinder head.

9 Claims, 5 Drawing Sheets

METALLIC GASKET

This application is a continuation of application Ser. No. 07/731,234, filed Jul. 17, 1991 now abandoned.

BACKGROUND OF THE INVENTION

1. Field of the Invention

This invention relates to a metallic gasket for use in sealing a clearance between the opposed surfaces of a cylinder head and a cylinder block in a multicylinder engine.

2. Description of the Prior Art

In a recent internal combustion engine, the increasing of the level of an output and the reducing of the weight have been demanded. Accordingly, a cylinder head and a cylinder block have been formed to smaller dimensions since the distance between adjacent cylinders, i.e. the distance between adjacent cylinder bores have increasingly been reduced. The distance between adjacent cylinder bores which is measured on the cylinder block is recently around 6 mm. Moreover, in order to further reduce the weight of an engine, the cylinder head and cylinder block tend to be produced out of an aluminum material having a low specific gravity. The low rigidity of an aluminum material and the small distance between adjacent cylinder bores have caused the rigidity of a cylinder head and a cylinder block of a recent internal combustion engine to tend to lower.

Figure 10:
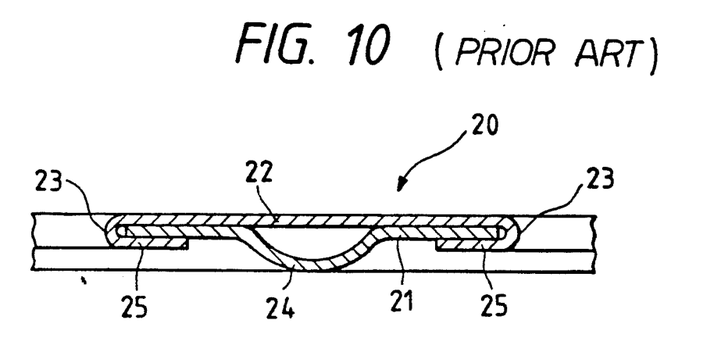
FIG. 10 is a sectional view of an example of a conventional metallic gasket.

In view of such a tendency, a metallic gasket shown in FIG. 10 has been proposed. This metallic gasket has a base member 21 consisting of an elastic metallic material and provided with cylinder bore-aligned holes, i.e. combustion chamber-aligned holes 23 and beads 24 surrounding the combustion chamber-aligned holes 23, and is adapted to seal the clearance between the cylinder head and cylinder block. In the metallic gasket 20, an auxiliary member 22 is laminated on the side of the base member 21 which is on the opposite side the surface thereof from which a bead 24 projects, and the edges of the auxiliary member 22 which are on the sides of the combustion chamber-aligned holes 23 are folded back onto the surface of the base member 21 so as to wrap the edge portion of the base member 21, whereby compensating portions 25 of a predetermined thickness are provided in positions on the side of the combustion chamber-aligned holes 23 and away from the beads 24. The metallic gasket 20 formed as described above prevents a combustion gas pressure and engine heat from causing the clearance between the opposed surfaces of the cylinder block and cylinder head to be widened and narrowed, and decreases the alternating load working on the bead 24, whereby the stress on the bead 24 is reduced. Since the surface pressure is dispersed to the compensating portions, the fatigue of the metallic gasket is prevented. The compensating portions constituting primary seals function as stoppers against the deformation of the bead 24 constituting a secondary seal. Since the portions around the combustion chamber-aligned holes 23 are sealed with both the compensating portions 25 and bead 24, the leakage of a combustion gas is prevented more reliably. The metallic gaskets having the above-described structure include metallic gaskets disclosed in, for example, the specifications and drawings of Japanese Patent Laid-open No. 155376/1987 and U.S. Pat. No. 3,817,540.

In the metallic gasket 20, a compensating portion 25 constituting a grommet consists of a total of three layers including the base member 21 and a folded auxiliary member 22, i.e. a two-layer auxiliary member 22. On the other hand, a bead consists of two layers having a closed hollow space therebetween, and the portion which is between the compensation portion 25 and bead 24 consists of two layers composed of the base member 21 and auxiliary member 22 contacting each other. Accordingly, the portion of an auxiliary member 22 which is positioned on the upper side of a folded portion thereof, and a folded portion, i.e. a compensating portion 25 are exposed directly to the variation of load and vibration occurring between the cylinder head and cylinder block. Therefore, when an auxiliary member 22 formed to a small thickness is used for a long period of time, a folded portion becomes ready to be cracked. Conversely, when an auxiliary member 22 formed to a large thickness is used, a tightening load occurring when the cylinder head is tightened with respect to the cylinder block is apt to be comparatively concentrated on a three-layer compensating portion 25, so that uniform surface pressure distribution cannot be secured around the cylinder bore-aligned holes. Consequently, an excellent sealed condition cannot be maintained for a long period of time.

Figure 11:
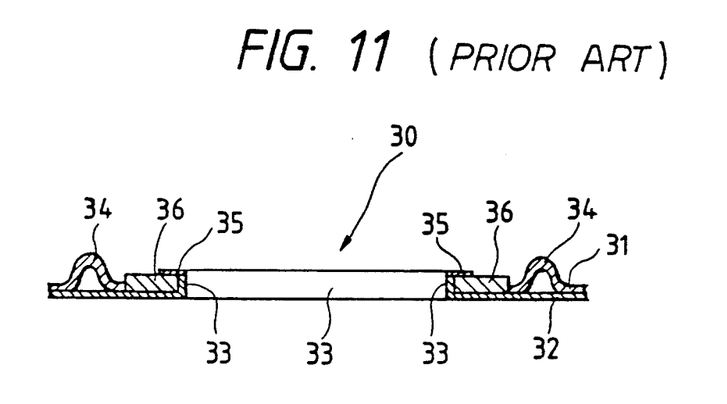
FIG. 11 is a sectional view of another example of a conventional metallic gasket.

The conventional metallic gaskets also include a metallic gasket shown in FIG. 11. This metallic gasket 30 includes in the upper part thereof a metallic upper member 31 provided with beads 34 surrounding cylinder bore-aligned holes 33, and in the lower part thereof a lower member 32 laminated on the lower surface of the upper member 31 and bent at its edge portions on the side of the cylinder bore-aligned holes 33 toward the upper member 31 to form the cylinder bore-aligned holes 33 with shims 36 of a high rigidity provided in the spaces surrounded by the inner edge portions of the upper member 31 and the bent portions of the lower member 32. When such a metallic gasket 30 is pressed by the cylinder head and deformed to a level not lower than a predetermined level, the cylinder head contacts the shims 36. Since the shims 36 have a high rigidity, the metallic gasket 30 is not deformed any more, and it is expected that the beads 34 does not fatigue. This type metallic gaskets include a metallic gasket disclosed in, for example, Japanese Utility Model Laid-open No. 134966/1987.

In the metallic gasket 30, the shims 36 are provided immovably in the spaces surrounded by the inner edge portion of the upper member 31 and the bent portions 35 consisting of the edge portions of the lower member 32 which are on the side of the cylinder bore-aligned holes 33, and turned up toward the upper member 31. Therefore, it is necessary to prepare the shims 36 additionally, and the number of parts for manufacturing the metallic gasket 30 and the cost of manufacturing the same increase. The main portion of the lower member 32 and the portions thereof which are wrapped around the shims 36 contact the cylinder head and cylinder block as in the previously-described prior art metallic gasket. Accordingly, when the lower member 32 is formed to a small thickness, cracks are liable to occur, and, conversely, when the lower member 32 is formed to a large thickness, uniform surface pressure distribution cannot be secured around the cylinder bore-aligned holes 33.

Figure 12:
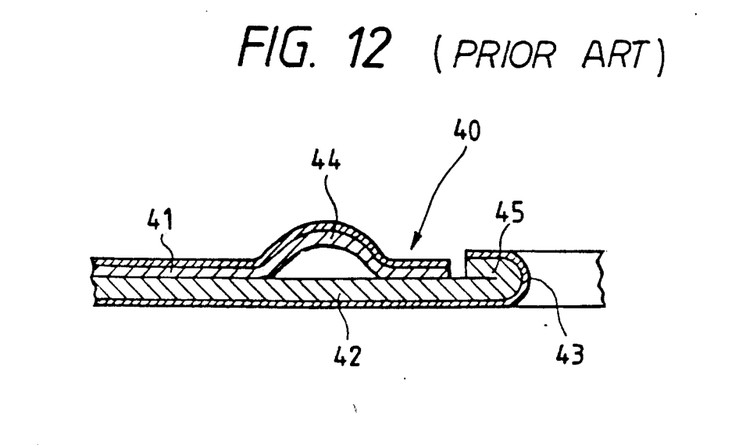
FIG. 12 is a sectional view of still another example of a conventional metallic gasket.

A metallic gasket shown in FIG. 12 has also been proposed. A metallic gasket 40 consists of a base member 41 composed of an elastic metal plate, and provided thereon with a bead 44 surrounding a cylinder bore-aligned hole 43, to seal the same hole 43. An auxiliary member 42 the thickness of which is larger than that of the base member 41 is laminated on the side of the base member 41 which is opposite to the side thereof on which the bead 44 is formed, and the edge portion of the auxiliary member 42 which is on the side of the cylinder bore-aligned hole 43 is folded back on itself to form a compensating portion 45 of a predetermined thickness around the cylinder bore-aligned hole 43 with the inner end of the base member 41 and the end of the compensating portion 45 spaced from each other by a predetermined distance. Accordingly, although the bead 44 in the base member 41 is compressively deformed when the cylinder head is tightened onto the cylinder block, the folded portion 45 is not damaged and broken since the end surface of the inner circumferential portion of the base member 41 is not in contact with the folded portion 45 of the auxiliary member 42. Consequently, it can be expected that the lifetime of the metallic gasket 40 is prolonged. This type of metallic gaskets include a metallic gasket disclosed in, for example, Japanese Patent Laid-open No. 211660/1989.

In the metallic gasket 40, the thickness of the auxiliary member 42 laminated on the base member 41 provided with the bead 44 surrounding the cylinder bore-aligned hole 43 is larger than that of the base member 41. Therefore, when the cylinder head is tightened with respect to the cylinder block, a tightening load is apt to be comparatively concentrated on the compensating portion 45, so that uniform surface pressure distribution cannot be secured around the cylinder bore-aligned hole 43. The reasons reside in that, if the thickness of the bead-carrying member and that of the auxiliary member are set equal, a tightening load is not necessarily be concentrated on the folded compensating portion. It is in any case necessary in this metallic gasket 40 that the thickness of the auxiliary member 42 be set larger than that of the base member 41. Since the thickness of the auxiliary member 42 is large, the processability thereof is low, and cracks are liable to occur in the folded portion, the manufacturing cost becoming high. Moreover, a total thickness of the metallic gasket becomes large. Since the thickness of the auxiliary member 42 is large, it is difficult that the surface pressure distribution on the side of the auxiliary member 42 (cylinder block surface, for example, when the auxiliary plate 42 is disposed on the side of the cylinder block) be set proper, and it is impossible to generate the concentration of surface pressure in a predetermined position. Consequently, the surface pressure disperses more than necessary, and excellent sealed condition cannot after all be maintained.

SUMMARY OF THE INVENTION

An object of the present invention is to solve these problems, and provide a metallic gasket having a base member provided with beads, and an auxiliary member laminated on the bead-carrying base member and provided with a folded portion on the auxiliary member; formed so that, when the bead-carrying base member and auxiliary member are tightened between a cylinder head and a cylinder block, the folded portions contact a flat surface portion of the bead-carrying base member to limit the deformation of the beads and prevent the beads from being completely compressed; and capable of distributing a face-to-face pressure uniformly and improving the sealability while securing the strength of the beads without causing cracks to occur in the beads, and a tightening load to be concentrated on the folded portions of the auxiliary member.

Another object of the present invention is to provide a metallic gasket consisting mainly of a bead-carrying base member formed out of an elastic metallic material and provided with beads along the circumferential portions of parallel-arranged first cylinder bore-aligned holes, an auxiliary member laminated on the bead-projecting side of the bead-carrying base member and spaced in a no-load state at the end portions which are on the side of second cylinder bore-aligned holes from a flat surface portion of the bead-carrying base member, and folded portions formed by folding back the end portions of the auxiliary member which are on the side of the second cylinder bore-aligned holes onto the bead-carrying base member so as not to be put over the beads.

When this metallic gasket is tightened between a cylinder head and a cylinder block, the bead-carrying base member is deformed so that the beads are crushed, due to the elastic effect of the elastic metal material thereof. During this time, the portions of the bead-carrying base member which are between the beads and the end portions on the side of the first cylinder bore-aligned holes are deformed so as to be crushed toward the first cylinder bore holes. The folded portions of the auxiliary member are simply directed in a free state from and toward the bead-carrying base member so as not to be laminated on the beads, and the auxiliary member does not embrace the bead-carrying base member. Namely, the folded portions are permitted to relatively move between the inner ends thereof and the opposed ends of the beads, and do not receive a tensile stress or a displacing force from the bead-carrying base member in an initial stage of a tightening operation. The folded portions function as stoppers for the bead-carrying base member, restrict the deformation of the beads and minimize the occurrence of fatigue of cracks in the beads, protect the beads in the bead-carrying base member and secure the strength of the beads.

Since the edge parts of the folded portions of the auxiliary member which are on the side of the second cylinder bore holes are folded back in the space between the auxiliary member and bead-carrying base member, one of the bead-carrying base member and auxiliary member is in contact with the cylinder head, and the other the cylinder block. Accordingly, the displacement between the cylinder head and cylinder block due to the variation of load and the vibration of parts does not directly work on the folded portion-included auxiliary member alone; it can be absorbed by the portion between the folded portion and base member. Therefore, variation of stress rarely occurs in the folded portion, and cracks and fatigue do not occur in the metallic gasket even when it is used for a long period of time.

This metallic gasket has a simple structure but the parts of the gasket in which the folded portions of the auxiliary member are positioned have three layers. Although the number of bead provided between the first cylinder bore-aligned holes is one, the number of sealed surface in which a face-to-face pressure occurs is three including the two folded portions plus the bead. Accordingly, when the cylinder head and cylinder block are tightened with this metallic gasket set between the opposed surfaces thereof, the bead is compressed forcibly against the auxiliary member to reduce the height of the bead and simultaneously press the folded portions of the auxiliary member against the flat surface portions of the bead-carrying base member which are on the side of the first cylinder bore holes. Even when the bead is pressure-deformed, it is not completely compressed, i.e., the lower portions of the bead the height of which corresponds to the thickness of a folded portion, i.e. the thickness of one layer of the gasket are left uncompressed. This enables the occurrence of fatigue and cracks in the bead to be prevented, the excellent sealing function of the metallic gasket against a high-temperature high-pressure combustion gas to be displayed, and the leakage of a combustion gas to be prevented.

The range in which a folded portion is extended can be set arbitrarily unless the folded portion does not overlap the bead. Accordingly, when the metallic gasket is designed, the distribution of face-to-face pressure on the bead and folded portions can be regulated. Since the thickness of the auxiliary member can be set arbitrarily, this member can display its function as a shim. It also works as a member for fitting the metallic gasket excellently in the clearance between the cylinder head and cylinder block, and improves its function of sealing the space between the opposed surfaces of the cylinder head and cylinder block.

Still another object of the present invention is to provide a metallic gasket having a bead-carrying base member and an auxiliary member each of which is coated at both surfaces thereof or the surface thereof which contacts a cylinder head or a cylinder block with heat resisting and oil resisting rubber or resin so as to avoid the direct metal-to-metal contact between the base and auxiliary members and cylinder head and cylinder block, and capable of improving the corrosion resistance and durability of the gasket, securing the strength thereof and fulfilling the sealing function thereof satisfactorily.

A further object of the present invention is to provide a metallic gasket having a soft member of a uniform thickness inserted between an auxiliary member and folded portions thereof so as to extend over the whole circumferential length thereof, or a stepped soft member inserted between the auxiliary member and folded portions thereof so that a larger-thickness portion thereof is positioned between adjacent cylinder bore holes, or a soft member inserted between only the parts of the auxiliary member and folded portions thereof that are between adjacent cylinder bore-aligned holes.

When a soft member is inserted between the auxiliary member and folded portions thereof in this metallic gasket, the thickness of the portions of the gasket which include the folded portions increases, and the soft member functions as a buffer member to enable a face-to-face pressure suitable to the rigidity of a cylinder head to be secured, the distribution of face-to-face pressure on the metallic gasket to be properly compensated, the face-to-face pressures on the cylinder head- and cylinder block-contacting surfaces of the gasket and that on the beads to be balanced with each other. In order to effect the securing of a face-to-face pressure on the gasket suitable for the rigidity of the cylinder head, the proper compensation of face-to-face pressure distribution, and the balancing of the surface pressures on the cylinder head- and cylinder block-contacting surfaces and that of the beads, a soft member of a uniform thickness is inserted between the auxiliary member and folded portions thereof so as to extend over the whole circumferential length thereof, or a stepped soft member is inserted between the auxiliary member and folded portions thereof so that a larger-thickness portion thereof is positioned between adjacent cylinder bore-aligned holes, or a soft member is inserted in a certain case between only the parts of the auxiliary member and folded portions thereof that are between adjacent cylinder bore-aligned holes.

While the engine is operated, a force, such as a tensile force due to vibration and explosion occurs between the cylinder head and cylinder block. However, since the auxiliary member is laminated on the bead-carrying base member, especially, the lateral vibration does not work on the bead-carrying base member only, so that a damage to the bead-carrying base member due to the friction thereof on the cylinder head or cylinder block is avoided. The vibration or an impact in the vertical direction, i.e. the perpendicular direction of the bead-carrying base member is not directly imparted from the cylinder head or cylinder block to both surfaces of the base member, and the auxiliary member therefore has a kind of buffer action against the bead-carrying base member. Since the folded portions of the auxiliary member do not embrace the bead-carrying base member, parts influenced directly by the variation of load and vibration are not limited to the auxiliary member, and the folded portions of the auxiliary member are not fatigued and cracked. Unlike the main body and folded portions of an auxiliary member of a conventional metallic gasket, the corresponding parts of the auxiliary member in the present invention do not receive large stress and strain, so that inexpensive materials of a high processability can be selectively used.

DESCRIPTION OF THE PREFERRED EMBODIMENTS

Figure 1:
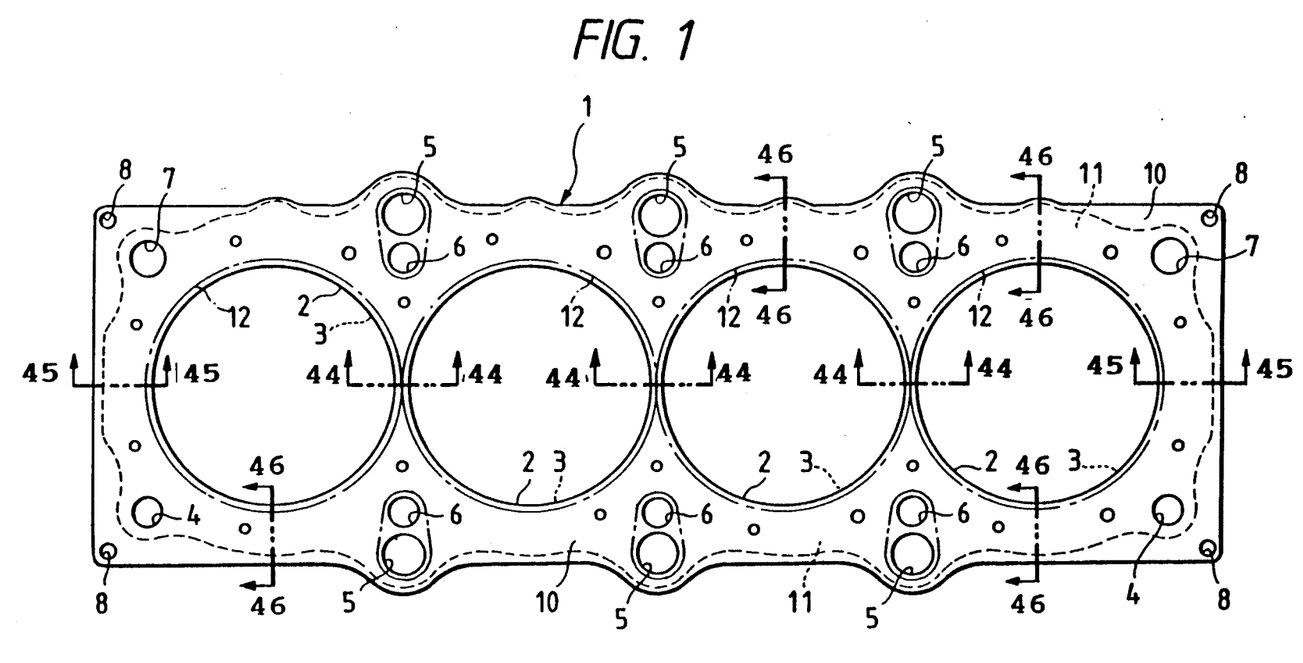
FIG. 1 is a plan view of an embodiment of the metallic gasket according to the present invention.

The embodiments of the metallic gasket according to the present invention will now be described with reference to the drawings. FIG. 1 is a plan view of a general embodiment of the metallic gasket according to the present invention.

This metallic gasket 1 is used to seal a clearance between the opposed surfaces of a cylinder head and a cylinder block in a multicylinder engine, such as a four-cylinder engine. This metallic gasket 1 consists mainly of a bead-carrying base member 10 and an auxiliary member 11. The bead-carrying base member 10 is provided with cylinder bore holes 2, the number of which corresponds to that of the cylinder bores in the cylinder block, formed in parallel with one another, and the auxiliary member 11 a plurality of cylinder bore holes 3 correspondingly to the cylinder bore holes 2 and in parallel with one another. The metallic gasket 1 is further provided with a plurality of bolt holes 4, 6 for use in connecting the cylinder block and cylinder head together, and a plurality of holes for passing cooling water therethrough, holes for passing an oil therethrough, oil return holes 5, knock holes 7 and rivet holes 8.

Figure 2:
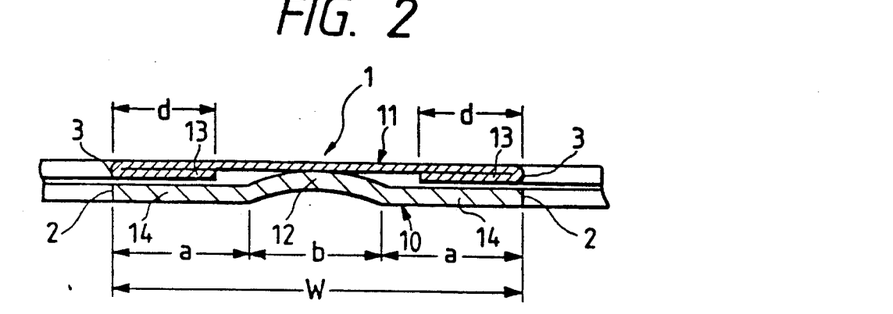
FIG. 2 is a sectional view of the embodiment of the metallic gasket taken along the line 44—44 in FIG. 1.
Figure 3:
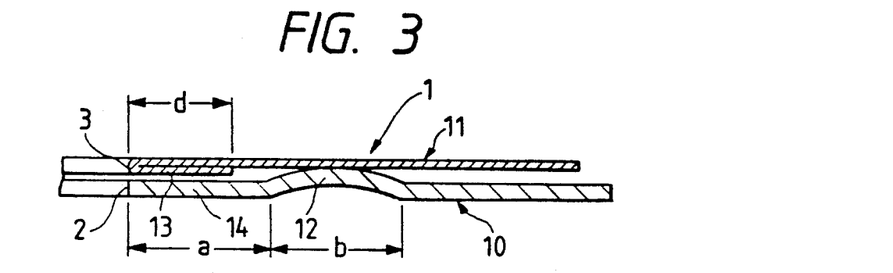
FIG. 3 is a sectional view of the embodiment of the metallic gasket taken along the line 45—45 or 46—46 in FIG. 1.

FIG. 2 shows an embodiment of the metallic gasket in section taken along the line 44—44 in FIG. 1, which line extends across a border portion between adjacent cylinder bore holes 2, 3 and connects the centers of these holes 2, 3. FIG. 3 shows the same embodiment of the metallic gasket in section taken along the line 45—45 or 46—46 in FIG. 1, which line passes the center of the extreme end cylinder bore holes 2, 3 and extends across a portion between these cylinder bore-aligned holes 2, 3 and the outermost edge portion of the metallic gasket 1.

This metallic gasket 1 basically consists of a bead-carrying base member 10, and an auxiliary member 11 as shown in FIGS. 2 and 3. The bead-carrying base member 10 consists of a metallic spring plate of about 0.25 mm in thickness, and the material for the spring plate is selected from SUS 301 and SUS 304, or SK1-7, which has a Vickers' hardness HV of 350–500. The auxiliary member 11 consists of a metallic spring plate of about 0.12 mm in thickness, and the material for the spring plate is selected from SUS 304, aluminum-plated steel plate SA1C, regular steel plate SPCC and zinc-plated steel plate SECC, the Vickers' hardness Hv of which is set selectively to not more than 200.

In this metallic gasket 1, the surfaces of the bead-carrying base member 10 and auxiliary member are coated with heat resisting and oil resisting rubber or resin to a thickness of, for example, around 10–50μ. This coating operation may be carried out for both surfaces of the bead-carrying base member and auxiliary member, or for the contact surfaces only of the cylinder head and cylinder block in some cases. If the surfaces of the bead-carrying base member 10 and auxiliary member 11 are coated in such a manner, the metal-to-metal contact of the gasket with the cylinder head and cylinder block is avoided, the corrosion resistance and endurance of the gasket can be improved. It also becomes possible to secure a satisfactory strength of the gasket and sufficiently fulfill its sealing function.

As shown in FIGS. 1 and 2, the bead-carrying base member 10 is provided with a bead 12 around each cylinder bore hole 2, the height of which bead 12 is 0.2–0.3 mm. The portions of two adjacent beads 12 around adjacent cylinder bore holes 2 which meet each other are united into one to form a common bead portion. A range designated by a reference letter a in FIG. 2 of the bead-carrying base member 10 has a flat surface, i.e., forms a flat portion 14, and a range designated by a reference letter b is a curved portion which forms the bead 12 on the base member 10. For example, the length of each of the ranges a, b is 2.0 mm, and a minimum width W of the cylinder bore hole 2 in the metallic gasket 1 is 6.0 mm including the lengths of the ranges a, b.

The auxiliary member 11 is laminated on the side of the bead-carrying base member 10 from which the beads 12 project. The auxiliary member 11 as a whole is formed to substantially the same shape as the bead-carrying base member 10. An auxiliary member body extends substantially flat, and the circumferential edge, which is around each cylinder bore-aligned hole 3, of the auxiliary member is folded back on the side of the bead-carrying base member 10 to form a folded portion 13. The width d of the folded portion 13 is 1.5 mm, and the free end of the folded portion 13 is not superposed on the bead 12 on the base member 10. The auxiliary member 11, in a free state in which it has not yet been tightened with respect to the bead-carrying base member 10, i.e., in a no-load state, contacts the base member 10 along closed curves connected to the apex of the bead 12. Namely, the auxiliary member 11 is laminated on the side of the base member 10 from which the bead 12 projects, and spaced at the end portions thereof which are on the side of the cylinder bore holes 3 from the flat portion 14 of the bead-carrying base member 10. The folded portion 13 of the auxiliary member 11 is formed by folding back the end portion thereof which is on the side of the cylinder bore holes 3 toward the bead-carrying base member 10 in such a manner that the folded portion is not superposed on the bead 12. During the production of a metallic gasket 1, the bead-carrying base member 10 and auxiliary member 11 may be fastened to each other tentatively after they have been made, at several portions of the upper side of each bead 12 so as to be unitized.

Figure 13:
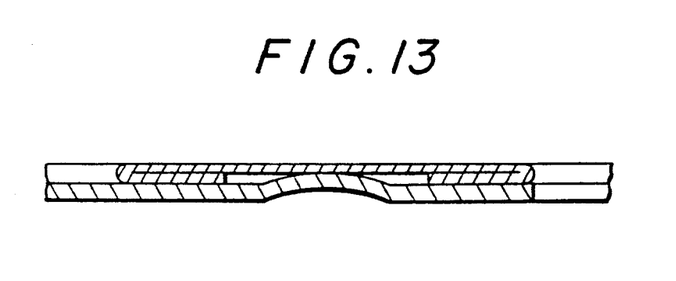
FIG. 13 is a sectional view of the metallic gasket in a compressed state.

The metallic gasket 1 is tightened between the cylinder head and cylinder block but it is not decided strictly beforehand which of the two, i.e. the base member 10 and auxiliary member 11 should be placed on the side of the cylinder head. When bolts are passed through the bolt holes 4, 6 to tighten the metallic gasket 1 between the cylinder head and cylinder block, each bead 12 is compressed forcibly against the auxiliary member 11 to receive a load, so that the height of the bead 12 is reduced. Since the bead 12 is deformed in the direction of the height thereof, the folded portions 13 of the auxiliary member 11 are pressed against the flat portions 14, which are on the side of the cylinder bore holes 2, of the bead-carrying base member 10. This tightened or compressed state is illustrated in FIG. 13.

When the auxiliary member 11 has folded portions 13, the metallic gasket 1 necessarily consists of three layers, and the thickness of the parts of the metallic gasket 1 which is provided with the folded portions 13 is therefore larger than that of the other. Accordingly, the folded portions 13 function as stoppers, and the bead 12 is prevented from being completely compressed, i.e., it is kept as thick as the thickness of a folded portion 13. This can prevent fatigue and cracks from occurring in the bead 12 of the bead-carrying base member 10. The width of the folded portions 13 can be set arbitrarily unless the folded portions 13 are superposed on the bead 12 on the base member 10. Since the width to which the auxiliary member 11 is folded to form these portions 13 has a considerable degree of freedom, the distribution of face-to-face pressure thereof with respect to the bead 12 can be regulated. Since the thickness of the auxiliary member 11 can be set arbitrarily, this member can display its function as a shim and its function of fitting the metallic gasket 1 in the clearance between the cylinder head and cylinder block, and improves its function of sealing the opposed surfaces of the cylinder head and cylinder block.

While the engine is operated, a tensile force due to vibration and explosion occurs between the cylinder head and cylinder block. However, since the auxiliary member 11 is laminated on the bead-carrying base member 10, especially, the lateral vibration does not work on the base member 10 only, so that a damage to the base member 10 due to the friction thereof on the cylinder head and cylinder block is avoided. The vibration or an impact in the vertical direction, i.e. the perpendicular direction of the surface of the bead-carrying base member 10 is not directly imparted from the cylinder head or cylinder block to both surfaces of the base member 10, and the auxiliary member 11 has a kind of buffer action against the base member 10. Since the folded portions 13 of the auxiliary member 11 do not embrace the bead-carrying base member 10, parts influenced directly by the displacement in the base member due to the compression of the bead 12, and the variation of load and vibration between the cylinder head and cylinder block are not limited to the auxiliary member 11. Accordingly, neither fatigue nor cracks occur in the folded portions 13 of the auxiliary member 11.

Figure 4:
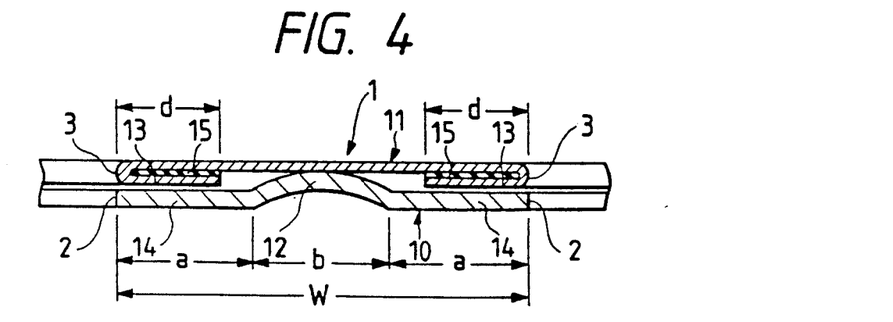
FIG. 4 is a sectional view of another embodiment of the metallic gasket taken along a line corresponding to the line 44—44 in FIG. 1.

Another embodiment of the metallic gasket according to the present invention will now be described with reference to FIGS. 4 and 5. FIG. 4 is a sectional view taken along a line corresponding to the line 44—44 in FIG. 1, and FIG. 5 a sectional view taken along a line corresponding to the line 45—45 or 46—46 in FIG. 1. The constituent elements which are identical with those of the embodiment of FIGS. 2 and 3 of this embodiment are designated by the same reference numerals, and the repetition of the same descriptions is omitted.

Figure 5:
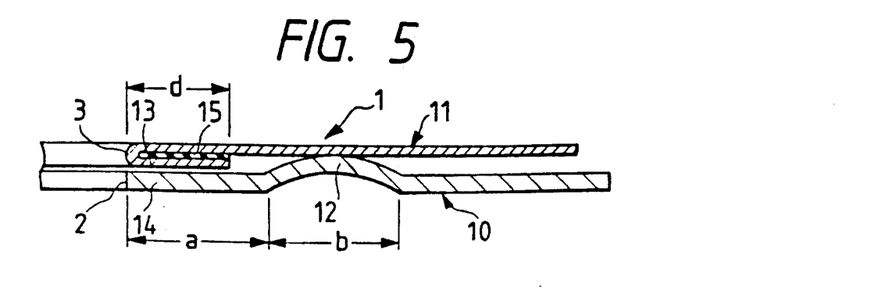
FIG. 5 is a sectional view of the embodiment of FIG. 4 taken along a line corresponding to the line 45—45 or 46—46 in FIG. 1.

Referring to FIGS. 4 and 5, a shim 15 consisting of an annular soft member the thickness of which is uniform in the direction of the whole circumference thereof is inserted between the main portion of the auxiliary member 11 and the folded portions 13 thereof, and embraced by these folded portions 13. The width of the annular body of the shim 15 is set smaller than that of the folded portion 13 to secure the embracing force. The edge parts of the folded portions 13 may be further bent toward the main portion of the auxiliary member 11 to completely enclose the shim 15. Since the shim 15 is provided between the main portion of the auxiliary member 11 and the folded portions 13 thereof, the thickness of the auxiliary member 11 can be regulated at the folded portions 13 by the shim 15. The shim 15 may consist of a soft metal plate just as the auxiliary member 11, or a material the properties of which are identical with those of a soft metal, such as a heat insulating graphite sheet, an aramid beater sheet, a resin or rubber. Moreover, the shim 15 functions as a buffer member, and can be expected to absorb vibration occurring between the cylinder head and cylinder block.

Figure 6:
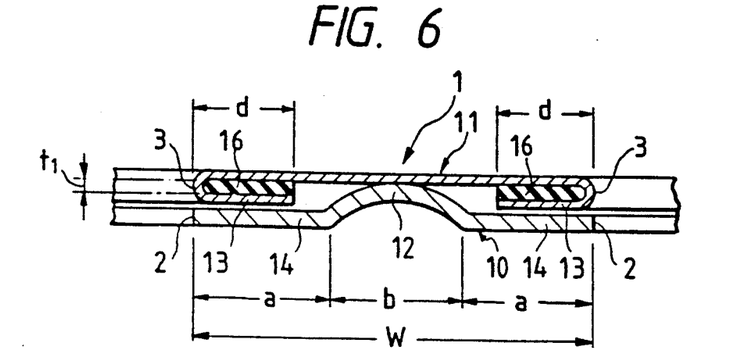
FIG. 6 is a sectional view of still another embodiment of the metallic gasket taken along a line corresponding to the line 44—44 in FIG. 1.

Still another embodiment of the metallic gasket according to the present invention will now be described with reference to FIGS. 6 and 7. FIG. 6 is a sectional view taken along a line corresponding to the line 44—44 in FIG. 1, and FIG. 7 a sectional view taken along a line corresponding to the line 45—45 or 46—46 in FIG. 1. The constituent elements which are identical with those of the embodiment of FIGS. 2 and 3 of this embodiment are designated by the same reference numerals, and the repetition of the same descriptions is omitted.

Figure 7:
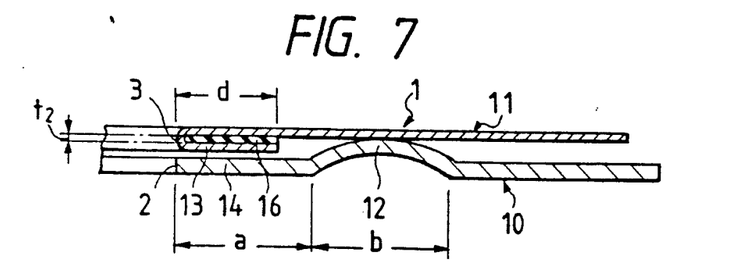
FIG. 7 is a sectional view of the embodiment of FIG. 6 taken along a line corresponding to the line 45—45 or 46—46 in FIG. 1.

Referring to FIGS. 6 and 7, a soft member 16 is provided between the main portion of the auxiliary member 11 and the folded portions 13 thereof, which soft member 16 is formed so that the portions thereof which are between adjacent cylinder bore holes 3 are thicker than the other portion thereof. Namely, the thickness $t_1$ of the portions of the soft member 16 which are between adjacent cylinder bore holes 3 and shown in FIG. 6 is larger than that $t_2$ (i.e., $t_1 > t_2$) of the portion thereof shown FIG. 7 which is other than the above-mentioned portions. Since the soft member 16 is formed in such a manner, a face-to-face pressure can be secured in accordance with the rigidity of the portions of the bead-carrying base member 10 and auxiliary member 11 which are around the cylinder bore holes 2, 3.

Figure 8:
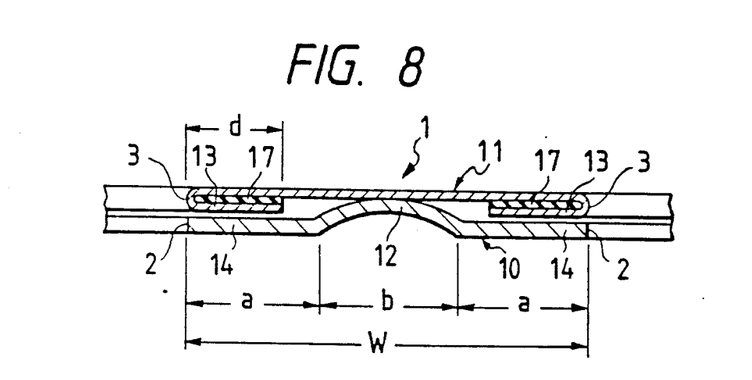
FIG. 8 is a sectional view of a further embodiment of the metallic gasket taken along a line corresponding to the line 44—44 in FIG. 1.

A further embodiment of the metallic gasket according to the present invention will now be described with reference to FIGS. 8 and 9. FIG. 8 is a sectional view taken along a line corresponding to the line 44—44 in FIG. 1, and FIG. 9 a sectional view taken along a line corresponding to the line 45—45 or 46—46 in FIG. 1. The constituent elements which are identical with those of the embodiment of FIGS. 2 and 3 of this embodiment are designated by the same reference numerals, and the repetition of the same descriptions is omitted.

Figure 9:
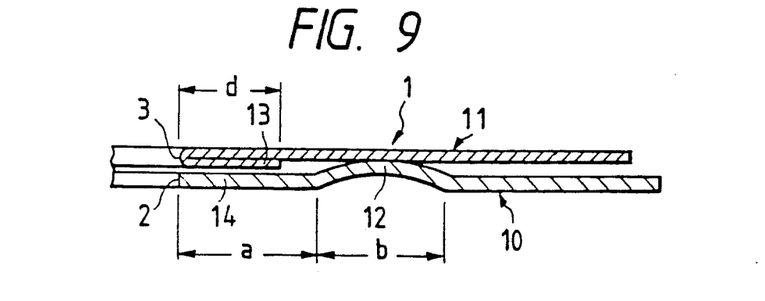
FIG. 9 is a sectional view of the embodiment of FIG. 8 taken along a line corresponding to the line 45—45 or 46—46 in FIG. 1.

Referring to FIGS. 8 and 9, a soft member 17 is provided between only the parts of the auxiliary member 11 and folded portions thereof that are between adjacent cylinder bore holes 3. The soft member 17 is provided only in the ranges which are shown in FIG. 8, and which are between adjacent cylinder bore holes 3, and it is not provided in the ranges shown in FIG. 9 and other than the ranges between adjacent cylinder boreholes. Since the soft member 17 is provided only in the ranges between adjacent cylinder bore holes 3, a face-to-face pressure can be secured much better in accordance with the rigidity of the portions of the bead-carrying base member 10 and auxiliary member 11 which are around the cylinder bore holes 2, 3.

These embodiments of the metallic gasket according to the present invention are described relatively to a four-cylinder engine. The engine to which the metallic gasket according to the present invention is applied is not limited to a four-cylinder engine; it can also be applied, of course, to other type of multicylinder engines, such as a V-type six-cylinder engine.

What is claimed is:

1. A laminated metallic gasket for use in sealing a clearance between opposed surfaces of a cylinder head and a cylinder block of a multicylinder engine, said gasket consisting of:
   a bead base member which is formed out of an elastic metallic material and has a flat portion,
   an auxiliary member laminated on said bead base member and formed out of an elastic metallic material,
   said bead base member having first cylinder bore holes formed parallel with one another said auxiliary member having second cylinder bore holes formed parallel with one another in alignment with said first holes;

said bead base member having a plurality of beads formed around the circumferential portions of said first cylinder bore holes in such a manner that one surface of each of said plurality of beads projects from said flat portion and another surface of each of said plurality of beads is recessed from a flat surface on the other side of said flat portion;

folded portions formed at an edge of said auxiliary member by folding parts of said auxiliary member which correspond to circumferential edge portions of said second cylinder bore holes, said folded portions folded toward said bead base member so as to control all degrees of compression of said beads on said bead base member;

said auxiliary member being laminated on a side of said bead base member from which said beads project, free end sections of said folded portions being spaced from said beads, said folded portions of said auxiliary member being spaced when in a no-load state from said flat surface of said bead base member;

upon compression of said base member and said auxiliary member a first face-to-face pressure is developed due to contact between said folded portions and said surface, and a second face-to-face pressure is developed between the surface of said bead that projects from said flat surface and said auxiliary member; and said first face-to-face pressure and said second face-to-face pressure are substantially equal.

2. A laminated metallic gasket for use in sealing a clearance between opposed surfaces of a cylinder head and a cylinder block of a multicylinder engine, said gasket consisting of:

a bead base member which is formed out of an elastic metallic material and has a flat portion, an auxiliary member laminated on said bead base member and formed out of an elastic metallic material, said bead base member having first cylinder bore holes formed parallel with one another said auxiliary member having second cylinder bore holes formed parallel with one another in alignment with said first holes;

said bead member having a plurality of beads formed around the circumferential portions of said first cylinder bore holes in such a manner that one surface of each of said plurality of beads projects from said flat portion and another surface of each of said plurality of beads is recessed from a flat surface on the other side of said flat portion;

folded portions formed at an edge of said auxiliary member by folding parts of said auxiliary member which correspond to circumferential edge portions of said second cylinder bore holes, said folded portions folded toward said bead base member so as to control all degrees of compression of said beads on said bead base member;

said auxiliary member being laminated on a side of said bead base member from which said beads project, free end sections of said folded portions being spaced from said beads, said folded portions of said auxiliary member being spaced when in a no-load state from said flat surface of said bead base member;

soft members provided between said auxiliary member and said folded portions thereof;

said soft members being spaced from said beads, upon compression of said base member and said auxiliary member a first face-to-face pressure is developed due to contact between said folded portions and said surface, and a second face-to-face pressure is developed between the surface of said bead that projects from said flat surface and said auxiliary member; and said first face-to-face pressure and said second face-to-face pressure are substantially equal.

3. A metallic gasket having a bead base member which is formed out of an elastic metallic material and which has a flat surface, and an auxiliary member laminated on said base member and formed out of an elastic metallic material, comprising:

a laminate consisting of only said base member and said auxiliary member;

first cylinder bore holes formed parallel with one another in said bead base member;

second cylinder bore holes formed in said auxiliary member so that said second holes are parallel with one another and in alignment with said first holes;

beads formed so as to extend around the circumferential portions of said first cylinder bore holes in said bead member in such a manner that one surface of each of said beads projects from said flat surface with the other surface of each of said beads recessed from a flat surface on the other side of said flat surface;

folded portions formed by folding the parts of said auxiliary member which correspond to the circumferential edge portions of said second cylinder bore holes toward bead base member so as to control all degrees of compression of said beads on said bead base member; said auxiliary member bearing laminated on the side of said base member from which said beads project, the free end sections of said folded portions being not superposed on said beads, said folded portions of said auxiliary member being spaced in a no-load state from said flat surface of said bead base member;

upon compression of said base member and said auxiliary member a first face-to-face pressure is developed due to contact between said folded portions and said surface, and a second face-to-face pressure is developed between the surface of said bead that projects from said flat surface and said auxiliary member; and said first face-to-face pressure and said second face-to-face pressure are substantially equal.

4. A metallic gasket having a bead base member which is formed out of an elastic metallic material, and which has a flat surface, and an auxiliary member laminated on said base member and formed out of an elastic metallic material, comprising:

a laminate consisting of only said base member and said auxiliary member;

first cylinder bore holes formed parallel with one another in said base members;

second cylinder bore holes formed in said auxiliary member so that said second holes are parallel with one another and in alignment with said first holes;

beads formed so as to extend around the circumferential portions of said first cylinder bore holes in said bead member in such a manner that one surface of each of said beads projects from said flat surface with the other surface of each of said beads recessed from a flat surface on the other side of said flat surface;

folded portions formed by folding the parts of said auxiliary member which correspond to the circumferential edge portions of said second cylinder bore holes toward said bead base member so as to control all degrees of compression of said beads on said bead base member; said auxiliary member being laminated on the side of said base member from which said beads project, the free end sections of said folded portions being not superposed on said beads, said folded portions of said auxiliary member being spaced in a no-load state from said flat surface of said bead base member;

soft members provided between said auxiliary member and said folded portions thereof;

upon compression of said base member and said auxiliary member a first face-to-face pressure is developed due to contact between said folded portions and said surface, and a second face-to-face pressure is developed between the surface of said bead that projects from said flat surface and said auxiliary member; and said first face-to-face pressure and said second face-to-face pressure are substantially equal.

5. A laminated metallic gasket according to claim 4, wherein said soft members are provided between said auxiliary member and said folded portions thereof so as to extend over the whole circumferences of said second cylinder bore holes, and have a uniform thickness.

6. A laminated metallic gasket according to claim 4, wherein said soft members are provided between said auxiliary member and said folded portions thereof and formed so that the thickness of the portions of said soft members which are between adjacent second cylinder bore holes is larger than the thickness of the remaining portions thereof.

7. A laminated metallic gasket according to claim 1, wherein said soft members are provided between said auxiliary member and said folded portions thereof so as to extend only between adjacent second cylinder bore holes.

8. A laminated metallic gasket according to claim 1, wherein said soft members are formed out of a metallic material.

9. A laminated metallic gasket according to claim 1, wherein said soft members are formed out of one of the materials including a heat insulating graphite sheet, an aramide beater sheet, a resin and rubber.

* * * * *